United States Patent Office 3,677,901
Patented July 18, 1972

3,677,901
PROCESS FOR THE PRODUCTION OF GLYCEROKINASE
Hans Ulrich Bergmeyer and Gotthilf Naher, Tutzing, Waldemar Thum, Tutzing-Unterzeismering, and Albert Lauerer and Rudolf Emmer, Tutzing, Germany, assignors to Boehringer Mannheim GmbH, Mannheim-Waldhof, Germany
No Drawing. Filed Sept. 9, 1970, Ser. No. 70,927
Claims priority, application Germany, Sept. 11, 1969, P 19 46 137.1
Int. Cl. C07g 7/028
U.S. Cl. 195—66 R      17 Claims

ABSTRACT OF THE DISCLOSURE

Glycerokinase is obtained in high yield and in stable form from micro-organisms by digesting dried micro-organisms by high pressure dispersion, subsequently subjecting same to a protamine precipitation, separating the precipitate formed and working up the filtrate in known manner with the use of an anion exchanger based on cellulose or dextran.

---

The present invention is concerned with a new and improved process for obtaining glycerokinase, particularly with a process which can be carried out on a large commercial scale.

In German patent specification No. 1,238,422, there is disclosed a process for the preparation of glycerokinase in which certain micro-organisms are lyophilized, an extract is produced from the lyophilizate by fermentation at 37° C., this is subjected to a heating stage, to a first ammonium sulfate fractionation, to a dialysis with subsequent anion exchanger chromatography and subsequently to a second ammonium sulfate fractionation. This process suffers from the disadvantage that considerable losses occur. Furthermore, it has been ascertained that the micro-organisms used sometimes change so much that the process can no longer be carried out.

A process is also known for preparing glycerokinase in which an extract is produced from strains such as *Escherichia coli* by ultrasonic digestion, this extract is subjected to streptomycin precipitation, subsequently to a heating step, then to a first ammonium sulfate fractionation, a dialysis, a second ammonium sulfate fractionation and finally to chromatography on diethylaminoethyl-cellulose. This process only gives moderate yields of about 30% and is not suitable for application to other micro-organisms.

There is, therefore, a need for the provision of a commercially useful process for the preparation of glycerokinase which gives yields which are more dependably reproducible than those of previously known processes.

According to the present invention there is provided a process for the preparation of glycerokinase from micro-organisms which process obviates or mitigates the drawbacks of such prior techniques.

Essentially, the process of the invention comprises digesting optionally dried micro-organisms by high pressure dispersion, subsequently subjecting same to a protamine precipitation, separating the precipitate formed and working up the filtrate in known manner with the use of an anion exchanger based on cellulose or dextran.

The process according to the present invention gives outstanding yields of a preparation which is stable and can be further purified in known manner.

As micro-organisms, there are preferably used *Candida mycoderma* strains. However, other micro-organisms with a sufficiently high content of glycerokinase can also be used as starting materials.

The micro-organisms can be used in a fresh or frozen state. It is also possible to start from a lyophilized material. In the latter case, a buffer solution is added in order to produce a paste, the concentration of which corresponds to that of freshly prepared cell paste.

The cell suspension is digested by high pressure dispersion in known manner. There is thus obtained an enzyme suspension, the solids content of which is expediently between 20 and 40 mg./ml. If necessary, water can be added before or after the digestion.

The enzyme suspension thus obtained is mixed with a solution of protamine sulfate, which preferably has a pH value of between 6 and 8. Since the glycerokinase does not precipitate out, it is possible to precipitate other materials exhaustively. Therefore, it is preferable to add such an amount of protamine sulfate solution that when further protamine solution is added, no further appreciable turbidity occurs.

The precipitate formed is removed in any suitable manner, for example, by filtration or centrifuging. The filter cake obtained is expediently washed with water and the wash water combined with the filtrate.

The combined filtrates thus obtained are treated in any desired manner with a anion exchanger based on cellulose or dextran. Preferably, there is used diethylaminoethyldextran gel (an ion exchanger based on dextran) or diethylaminoethyl-cellulose. The treatment can be carried out in a batch process or on a column. For the sake of simplicity, the treatment is preferably carried out in a batch process, i.e., direct addition of the anion exchanger to the enzyme solution.

The amount of exchanger to be used can easily be determined in each case by means of a simple preliminary experiment. Therefore, such an amount of anion exchanger is added that glycerokinase can no longer be detected in the supernatant.

The application of the diethylaminoethyl-cellulose step to the glycerokinase is in itself known and the methods which have previously been described for the elution can also be used for the process according to the present invention.

An important feature of the process according to the present invention is that the process steps are carried out in the described sequence without long interruption and expediently at a temperature of at most 10° C., preferably of 5° C. By means of the combination of process steps according to the present invention, there is thus obtained a surprisingly stable preparation which, even after standing for quite a long time in the cold, does not suffer any loss of activity.

Further purification can take place in any desired manner, expediently according to one of the known processes. For example, further purification preferably takes place according to the process described in German patent specification No. 1,238,422. For this purpose, subsequent to the combination of process steps according to the present invention, the further processing is according to step D of this known process, i.e., a heating step, with the application of all known purification steps.

When the preparation obtained according to the process of the present invention is worked up as above, then, with the use of the same starting material and in the same amount as in the process of the above-mentioned German patent specification, there is achieved an increase in yield of up to 300%, relative to the known process.

According to a preferred method of working up, the process obtained by the process according to the present invention is concentrated by an ammonium sulfate precipitation, subjected to a heating step at about 60° C., separated from precipitate and the enzyme precipitated with ammonium sulfate up to a molarity of about 3.2. The ammonium sulfate precipitate thus obtained is subjected to a second heating step under the same conditions, freed from denatured protein, dialyzed and then subjected to chromatography on an anion exchanger, preferably diethylaminoethyl-dextran gel. The eluate from the chromatography is subsequently crystallized in known manner with ammonium sulfate.

The following examples are given for the purpose of illustrating the present invention and are not to be construed as limitative thereof.

EXAMPLE 1

(1) Digestion 6 kg. *Candida mycoderma* were made up to 100 liters with phosphate buffer of pH 7.0 and stirred until homogeneous. The cell suspension obtained was then digested by high pressure dispersion and diluted with cold, desalinated water to 200 liters.

(2) Protamine sulfate precipitation

The enzyme suspension, with a solids content of 20 to 40 mg./ml., was mixed with a solution of protamine sulfate (pH 7.0, concentration=10 mg./ml.) until no further noticeable turbidity occurred. After briefly stirring, the precipitate was separated by centrifuging or by filtration.

(3) Anion exchanger treatment

The enzyme solution obtained was, after a preliminary test, immediately mixed with diethylaminoethyl-dextran gel (diethylaminoethyl-Sephadex) exchanger which had been washed free of salt and equilibrated to pH 7.0. The exchanger was separated off and the filtrate was discarded. The filter cake was stirred for 20 minutes with the threefold volume of 0.05 M potassium phosphate buffer (pH 7) and 0.1 M sodium chloride, whereafter it was suction filtered. The filtrate was discarded. The glycerokinase was then eluted with 0.05 M potassium phosphate buffer (pH 7.0) and 0.3 M sodium chloride. The combined eluates contained 72% of the originally present activity. The specific activity was about 8 units. For concentration, the solution was saturated with ammonium sulfate to 3.2 molarity and then centrifuged and the supernatant discarded.

(4) Heating

The precipitate from the ammonium sulfate precipitation was taken up with 0.05 M potassium phosphate buffer (pH 7.0) and saturated with ammonium sulfate to 1.0 M molarity. The solution was then heated for 10 minutes on a waterbath to 59° C., chilled to 10° C. in a cooling bath and centrifuged. The precipitate was discarded.

(5) Ammonium sulfate fractionation

The solution obtained as described above was satuarted with ammonium sulfate up to a molarity of 3.2. The precipitate was centrifuged off and suspended in 2.05 M ammonium sulfate solution and again centrifuged. The supernatant was discarded, the precipitate was taken up with 0.02 M potassium phosphate buffer (pH 6.5) and heating was repeated in the same manner as described above. The supernatant was mixed with ammonium sulfate up to a molarity of 3.2 and the precipitate was centrifuged off.

(6) Dialysis and chromatography

The precipitate was taken up in 0.05 M potassium phosphate buffer (pH 7.0) and dialyzed overnight in a refrigerator against the same buffer. The dialyzate was adjusted to a molarity of 0.1 with sodium chloride and applied to a column of diethylaminoethyl-Sephadex (diethylaminoethyl-dextran gel). The column was washed with 0.05 M potassium phosphate buffer (pH 7.0) and 0.125 M sodium chloride and then the glycerokinase was eluted with the same buffer and 0.2 M sodium chloride. The glycerokinase was crystallized in the eluate by the slow addition of ammonium sulfate up to a molarity of 2.4. Yield: 8 grams; specific activity: 85 u./mg.

EXAMPLE 2

Comparison

In order to demonstrate the decisive effect of the combination of process steps according to the present invention, the following comparative experiments were carried out. There were compared:

(1) The process according to the present invention;

(2) The process according to German patent specification No. 1,238,422;

(3) The process according to German patent specification No. 1,238,422 modified by an additional protamine sulfate step;

(4) The process according to German patent specification No. 1,238,422 modified by the protamine sulfate step and by a diethylaminoethyl-Sephadex (diethylaminoethyl-dextran gel) step;

(5) A method similar to that according to the present invention but in which the diethylaminoethyl-Sephadex (diethylaminoethyl-dextran gel) step was omitted after the protamine sulfate step.

In the carrying out of the experiments, the procedure was either as described in Example 1 above or as described in German patent specification No. 1,238,422. In experiments Nos. 1 and 2, 300 grams Candida were used as starting material, in experiment No. 3, 40 grams Candida were used as starting material and in experiment No. 4, 107 grams Candida were used as starting material.

In the case of the experiment according to the present invention, the yield was 58%. This corresponds to a yield of 330 mg. enzyme of 95 u./mg. from 300 grams Candida. The product was stable and the aqueous solutions before crystallization, were still 100% active after standing for 10 days at 0° C.

In the case of experiment No. 2, the yield was 8.8%. This corresponds to a yield of enzyme of 48 mg. of 95 u./mg. from 300 grams Candida. Thus, according to the present invention, there was obtained a 690% higher yield. The solutions obtained according to experiment No. 2 were completely inactive after standing for 10 days at 0° C.

In experiment No. 3, the yield was 5.2%. Calculated on 300 grams Candida, the yield was 23.8 mg. Thus, by the introduction of a protamine sulfate step, the yield of the known process was not improved.

In experiment No. 4, the yield was 22%. The yield referred to 300 grams Candida, was 100 mg. of 95 u./mg. In comparison with experiments Nos. 2 and 3, the yield was considerably improved.

Experiment No. 5 was only carried out up to the dialysis stage. It showed that, in the case of the omission of the anion exchanger step in the process according to the present invention, by the dialysis alone 34% of the activity was lost.

Details of the individual steps of the comparative experiments are set out in the following table, in which the volumes, activities and yields of the individual process steps of all comparative experiments are given:

TABLE

| | Step | Ml. | Activity | Yield, percent | Remarks |
|---|---|---|---|---|---|
| (1) | Extract from high pressure dispersion | 9,000 | $5.45 \times 10^4$ | 100 | According to the present invention. |
| | Protamine sulfate supernatant | 8,700 | $5.02 \times 10^4$ | 93 | |
| | Diethylaminoethyl-Sephadex eluate | 1,340 | $3.9 \times 10^4$ | 72 | |
| | Heating step (60° C.) supernatant | 1,280 | $3.07 \times 10^4$ | 57 | |
| | Ammonium sulfate (2.05 M) solution | 112 | $2.80 \times 10^4$ | 52 | |
| | Dialyzate | 65 | $3.54 \times 10^4$ | 65 | |
| | Diethylaminoethyl Sephadex eluate | 285 | $3.11 \times 10^4$ | 58 | |
| (2) | Extract from fermentation | 3,280 | $4.7 \times 10^4$ | 100 | According to German patent specification No. 1,238,422. |
| | Heating step (60° C.) supernatant | 3,280 | $1.71 \times 10^4$ | 36 | |
| | Ammonium sulfate (2.05 M) solution | 205 | $1.05 \times 10^4$ | 22 | |
| | Dialyzate | 164 | $1.01 \times 10^4$ | 21 | |
| | Diethylaminoethyl-Sephadex eluate | 470 | $0.41 \times 10^4$ | 8.8 | |
| (3) | Protamine sulfate supernatant after fermentation | 1,000 | $5.6 \times 10^3$ | 100 | According to German patent specification No. 1,238,422 plus protamine sulfate step. |
| | Heating step (60° C.) supernatant | 1,000 | $1.7 \times 10^3$ | 30 | |
| | Ammonium sulfate precipitate dissolved | 20 | $5.06 \times 10^2$ | 9.1 | |
| | Dialyzate | 22 | $3.86 \times 10^2$ | 6.9 | |
| | Diethylaminoethyl-Sephadex eluate | 250 | $2.9 \times 10^2$ | 5.2 | |
| (4) | Protamine sulfate supernatant after fermentation digestion. | 2,500 | $1.4 \times 10^4$ | 100 | According to German patent specification No. 1,238,422 plus protamine sulfate plus diethylaminoethyl-Sephadex step. |
| | Diethylaminoethyl-Sephadex eluate | 224 | $8.2 \times 10^3$ | 60 | |
| | Heating step (60° C.) supernatant | 202 | $3.96 \times 10^3$ | 28 | |
| | Ammonium sulfate precipitate dissolved | 20 | $4.14 \times 10^3$ | 29 | |
| | Dialyzate | 21 | $3.22 \times 10^3$ | 23 | |
| | Diethylaminoethyl-Sephadex eluate | 235 | $3.20 \times 10^3$ | 22 | Yield referred to protamine sulfate supernatant. |
| (5) | High pressure dispersion | 420 | $3.2 \times 10^2$ | 100 | Similar to the process of the present invention but without anion exchanger step. |
| | Protamine sulfate supernatant | 440 | $3.02 \times 10^2$ | 95 | |
| | Heating step (60° C.) supernatant | 440 | $2.62 \times 10^2$ | 82 | |
| | Ammonium sulfate precipitate dissolved | 20 | $2.72 \times 10^2$ | 85 | |
| | Dialyzate | 24.5 | $1.81 \times 10^2$ | 56 | |

EXAMPLE 3

Comparative

The process according to the present invention was compared with the Streptomycin sulfate step known from J. Biol. Chem. 242 (No. 5), 1030 in that this step is carried out inserted of the protamine sulfate step.

In this case, as described in Example 1, starting from Candida, there was carried out a high pressure digestion, subsequently a protamine sulfate precipitation, a diethylaminoethyl-Sephadex step and then a heating step for 60 minutes at 60° C. Under these substantially more severe conditions, the yield after the heating step was still 36% of the original activity. Since the yield of the preceding anion exchanger step was 72%, 50% of the residual activity was lost in the heating step.

The process was repeated in the same way except that instead of the protamine sulfate step, there was introduced a Streptomycin sulfate precipitation. In the subsequent anion exchanger step, four times as much exchanger was needed as in the process according to the present invention. The exchanger eluate had 54% of the original activity. Upon heating, a complete loss of activity occurred.

It will be understood that the foregoing description of the invention is not limitative thereof and that other embodiments within the spirit of the invention will suggest themselves to those skilled in the art.

What is claimed is:

1. Process for obtaining glycerokinase from micro-organisms which process comprises digesting such microorganisms by high pressure dispersion, subjecting the digested micro-organisms to a protamine sulfate precipitation, separating the precipitate formed, and working up the filtrate with an anion exchanger.

2. Process as claimed in claim 1 wherein said micro-organisms are dried prior to the digesting step.

3. Process as claimed in claim 1 in which said anion exchanger is based on cellulose or dextran.

4. Process as claimed in claim 1 wherein each step is carried out at a temperature not exceeding 10° C.

5. Process as claimed in claim 1 wherein the steps are carried out immediately sequentially without substantial interruption.

6. Process as claimed in claim 1 wherein the starting micro-organisms are in the fresh state.

7. Process as claimed in claim 1 wherein the starting micro-organisms are in a frozen or lyophilized state.

8. Process as claimed in claim 1 wherein said micro-organism is *Candida mycoderma*.

9. Process as claimed in claim 1 wherein the suspension obtained after the digestion step is adjusted to a solids content of 20–40 mg./ml.

10. Process as claimed in claim 1 wherein the protamine sulfate precipitation is carried out with the use of a solution of protamine sulfate with a pH value of between 6 and 8.

11. Process as claimed in claim 1 wherein the protamine sulfate solution is added in such an amount that continued addition does not result in any further appreciable turbidity.

12. Process as claimed in claim 1 wherein the precipitate from the protamine sulfate precipitate step is removed by filtering or centrifuging.

13. Process as claimed in claim 1 wherein the working up step is carried out by use of a column containing the anion exchanger.

14. Process as claimed in claim 1 wherein the working up step is carried out by addition of the anion exchanger to the enzyme solution filtrate.

15. Process as claimed in claim 1 wherein the enzyme is eluated from the anion exchanger and ammonium sulfate is added to the eluate to precipitate the enzyme.

16. Process as claimed in claim 1 wherein the enzyme obtained is suspended in a buffer solution, heated to about 60° C., and cooled, precipitated material is removed and the enzyme is precipitated from solution by the addition of ammonium sulfate.

17. Process as claimed in claim 1 wherein the enzyme obtained is taken up in a buffer solution and dialyzed against the said buffer solution, the dialyzate chromatographed with a column of an anion exchanger and the enzyme crystallized out from the eluate by the addition of ammonium sulfate.

References Cited

UNITED STATES PATENTS 3,440,142   4/1969   Teller _____ 195—66 A

FOREIGN PATENTS 1,238,422   4/1967   Germany.
715,572    9/1954   Great Britain.
1,067,253   5/1967   Great Britain.

OTHER REFERENCES

Colowick et al., Editors, Methods in Enzymology, vol. 5, pp. 354–361; 476–479 (1962).

LIONEL M. SHAPIRO, Primary Examiner